US012707491B2

(12) United States Patent
Lee et al.

(10) Patent No.: US 12,707,491 B2
(45) Date of Patent: Aug. 11, 2026

(54) METHOD AND DEVICE FOR TRANSMITTING PRACH IN NR V2X

(71) Applicant: LG Electronics Inc., Seoul (KR)

(72) Inventors: Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 404 days.

(21) Appl. No.: 18/035,692

(22) PCT Filed: Nov. 8, 2021

(86) PCT No.: PCT/KR2021/016169
§ 371 (c)(1),
(2) Date: May 5, 2023

(87) PCT Pub. No.: WO2022/098197
PCT Pub. Date: May 12, 2022

(65) Prior Publication Data

US 2023/0403734 A1 Dec. 14, 2023

(30) Foreign Application Priority Data

Nov. 6, 2020 (KR) ........................ 10-2020-0147960
Dec. 28, 2020 (KR) ........................ 10-2020-0185017

(51) Int. Cl.
*H04W 72/56* (2023.01)
*H04W 72/21* (2023.01)
(Continued)

(52) U.S. Cl.
CPC ........... *H04W 72/56* (2023.01); *H04W 72/21* (2023.01); *H04W 72/40* (2023.01); *H04W 74/0833* (2013.01); *H04W 92/18* (2013.01)

(58) Field of Classification Search
CPC ..... H04W 72/21; H04W 72/56; H04W 72/40; H04W 74/0833; H04W 92/18; H04W 72/569; H04W 4/40; H04W 72/232
See application file for complete search history.

(56) References Cited

U.S. PATENT DOCUMENTS

2021/0105126 A1* 4/2021 Yi ......................... H04L 5/0055
2022/0256470 A1* 8/2022 Zhang ................. H04W 52/346
(Continued)

FOREIGN PATENT DOCUMENTS

CN 110856192 A 2/2020
KR 10-2019-0079590 A 7/2019
WO WO 2020/145803 A1 7/2020

OTHER PUBLICATIONS

3GPP TS 38.213, V16.3.0, (Sep. 2020), 3rd Generation Partnership Project; Technical Specification Group Radio Access Network; NR; Physical layer procedures for control, (Release 16), 179 pages.
(Continued)

*Primary Examiner* — Brian D Nguyen
(74) *Attorney, Agent, or Firm* — Fish & Richardson P.C.

(57) ABSTRACT

An operating method for a first device (100) in a wireless communication system is presented. The method may comprise the steps of: transmitting an RA preamble to a base station (300); receiving, from the base station (300), a random access response (RAR) message related to the RA preamble; transmitting, to the base station (300), a physical uplink shared channel (PUSCH) as a response to the RAR message; receiving, from the base station (300), downlink control information (DCI) generated on the basis of a radio network temporary identifier (RNTI) related to the RA procedure, as a response to the PUSCH; determining overlapping between sidelink (SL) communication and physical uplink control channel (PUCCH) transmission related to the
(Continued)

DCI; and transmitting a PUCCH to the base station (300) on the basis of the overlapping.

6 Claims, 20 Drawing Sheets

(51) Int. Cl.

| | |
|---|---|
| ***H04W 72/40*** | (2023.01) |
| ***H04W 74/08*** | (2024.01) |
| ***H04W 74/0833*** | (2024.01) |
| ***H04W 92/18*** | (2009.01) |

(56) References Cited

U.S. PATENT DOCUMENTS

2022/0312435 A1* 9/2022 Ye .................... H04W 72/1268
2023/0254889 A1* 8/2023 Liu ...................... H04W 72/40
370/329
2023/0370204 A1* 11/2023 Yoshioka ............. H04L 1/1812

OTHER PUBLICATIONS

Extended European Search Report in European Appln. No. 21889662.9, mailed on Aug. 2, 2024, 9 pages.
Fujitsu, "Remaining issues on prioritization rule for NR V2X," R1-2004044, 3GPP TSG RAN WG1, #101, e-Meeting, May 25-Jun. 5, 2020, 6 pages.
International Search Report and Written Opinion in International Appln. No. PCT/KR2021/016169, mailed on Feb. 10, 2022, 14 pages (with English translation).
Vivo, "Remaining issues on physical layer procedure for NR sidelink," R1-2008669, 3GPP TSG RAN WG1, #103-e, e-Meeting, Oct. 26-Nov. 13, 2020, 8 pages.

* cited by examiner

FIG. 3

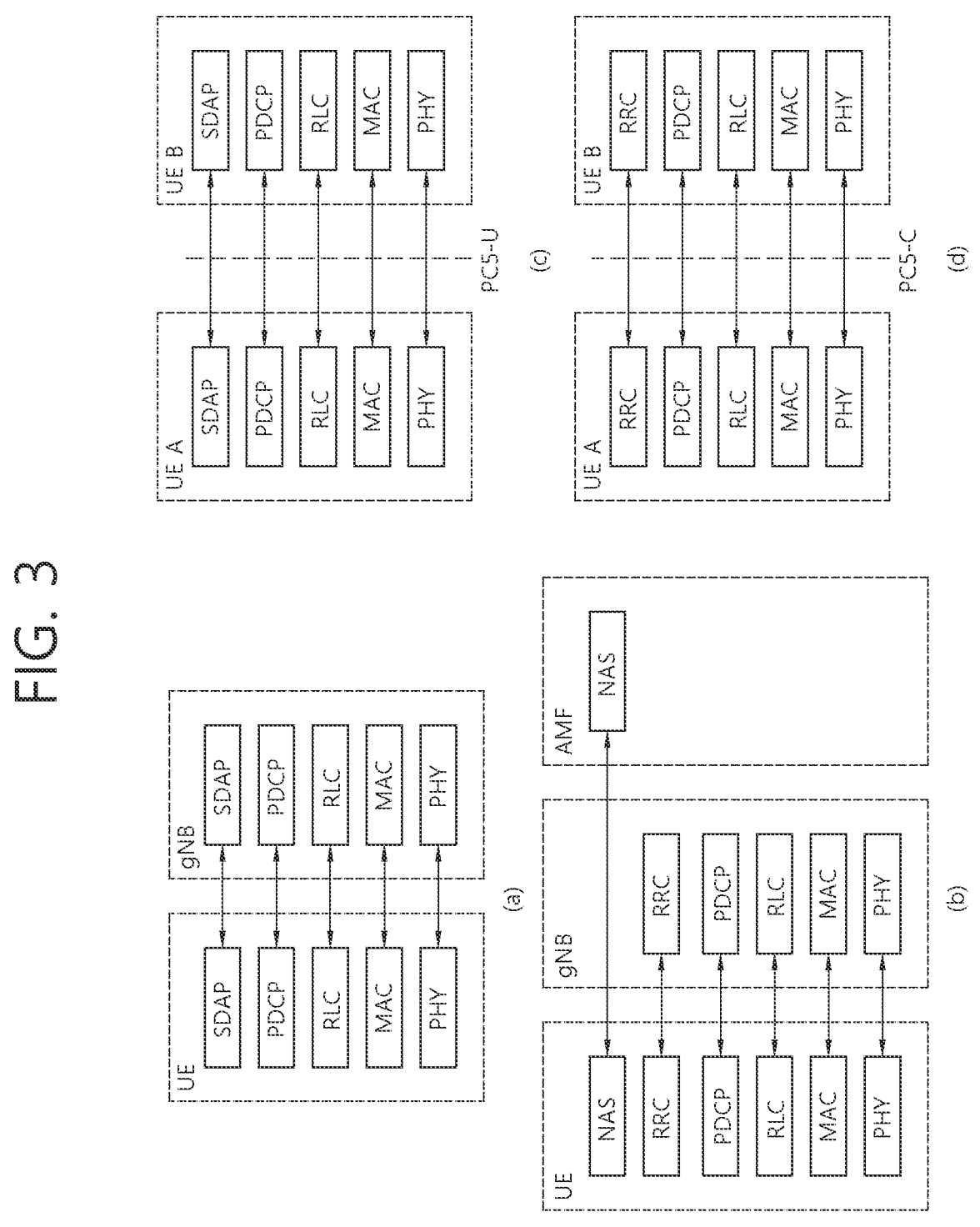

UE
SDAP
PDCP
RLC
MAC
PHY
gNB
SDAP
PDCP
RLC
MAC
PHY
(a)

UE
NAS
RRC
PDCP
RLC
MAC
PHY
gNB
RRC
PDCP
RLC
MAC
PHY
AMF
NAS
(b)

UE A
SDAP
PDCP
RLC
MAC
PHY
PC5-U
UE B
SDAP
PDCP
RLC
MAC
PHY
(c)

UE A
RRC
PDCP
RLC
MAC
PHY
PC5-C
UE B
RRC
PDCP
RLC
MAC
PHY
(d)

FIG. 5

Resource grid k=0 l=0

1 RE 1 symbol

1subcarrier

1RB=12 subcarriers

A BWP

A carrier
(up to 3300 subcarriers,
i.e., 275 RBs)

1
Hand-held device
100d
XR device
100c
Vehicle
100b-2
150b
Vehicle
100b-1
Home Appliance
100e
Network
(5G)
300
200
200a
150a
150c
IoT device
100f
AI Server/device
400
Robot
100a

FIG. 18

METHOD AND DEVICE FOR TRANSMITTING PRACH IN NR V2X

CROSS-REFERENCE TO RELATED APPLICATIONS

This application is a National Stage application under 35 U.S.C. § 371 of International Application No. PCT/KR2021/016169, filed on Nov. 8, 2021, which claims the benefit of Korean Patent Application No. 10-2020-0147960, filed on Nov. 6, 2020 and Korean Patent Application No. 10-2020-0185017, filed on Dec. 28, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

In one embodiment, a method of operating a first device 100 in a wireless communication system is proposed. The method may comprise: transmitting, to a base station, an RA preamble; receiving, from the base station, a random access response (RAR) message related to the RA preamble; transmitting, to the base station, a physical uplink shared channel (PUSCH) in response to the RAR message; receiving, from the base station, downlink control information (DCI) generated based on a radio network temporary identifier (RNTI) related to the RA procedure, in response to the PUSCH; determining an overlap between a physical uplink control channel (PUCCH) transmission related to the DCI and sidelink (SL) communication; and performing the PUCCH transmitting to the base station, based on the overlap.

The user equipment (UE) can efficiently perform SL communication.

BRIEF DESCRIPTION OF THE DRAWINGS

FIG. 3 shows a radio protocol architecture, based on an embodiment of the present disclosure.

FIG. 5 shows a structure of a slot of an NR frame, based on an embodiment of the present disclosure.

FIG. 18 shows another example of a wireless device, based on an embodiment of the present disclosure.

DETAILED DESCRIPTION

Figure 1:
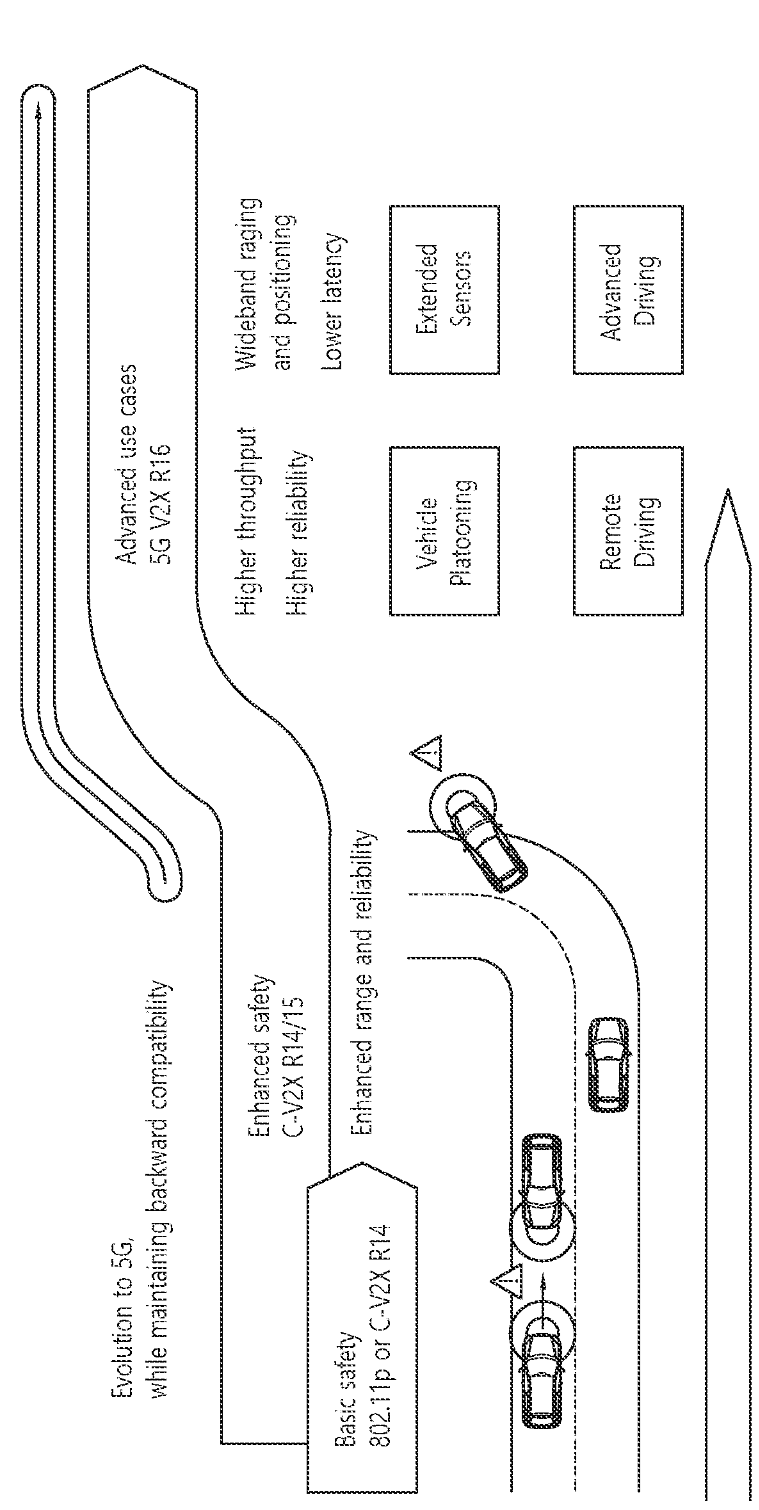
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
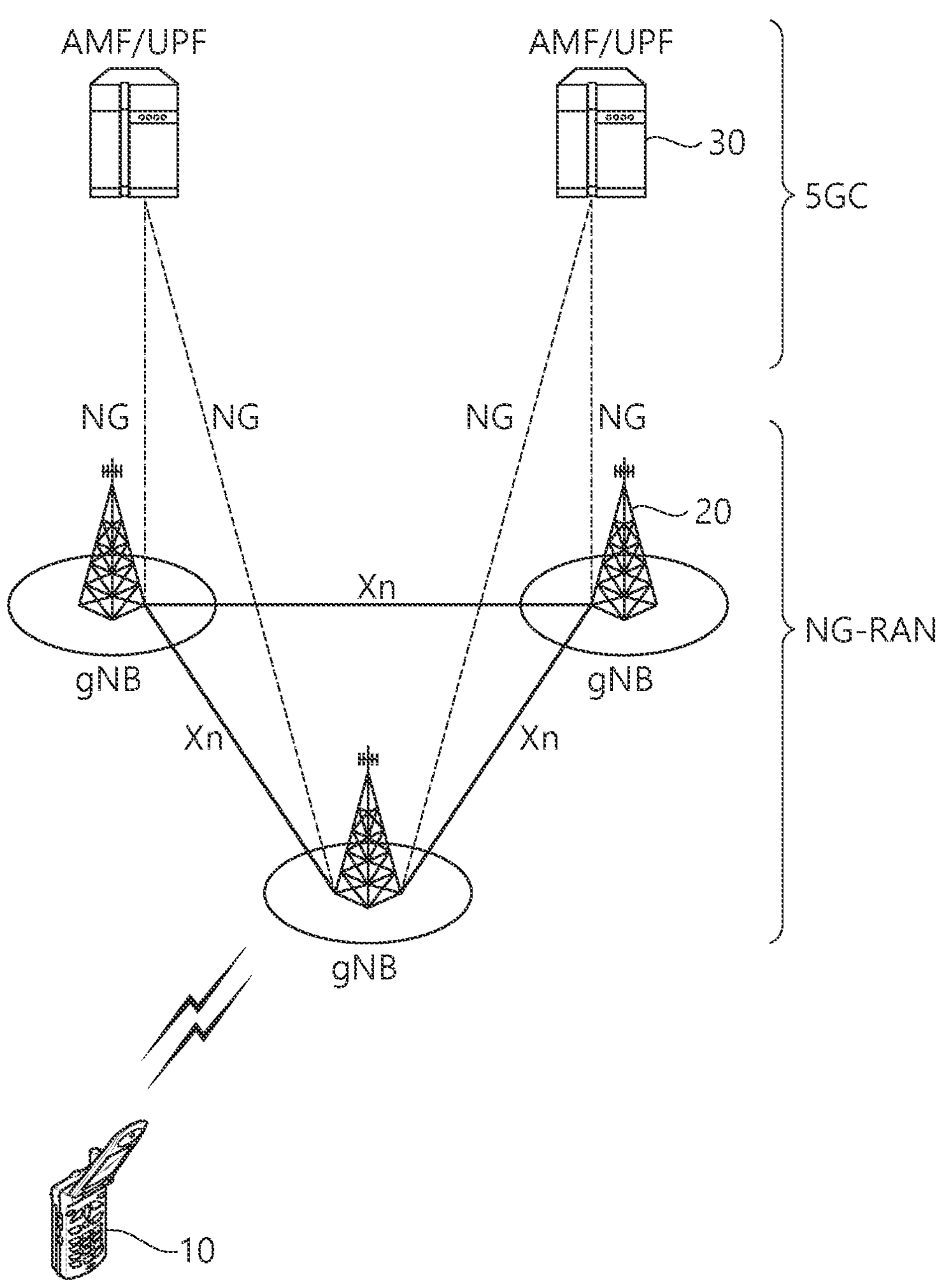
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
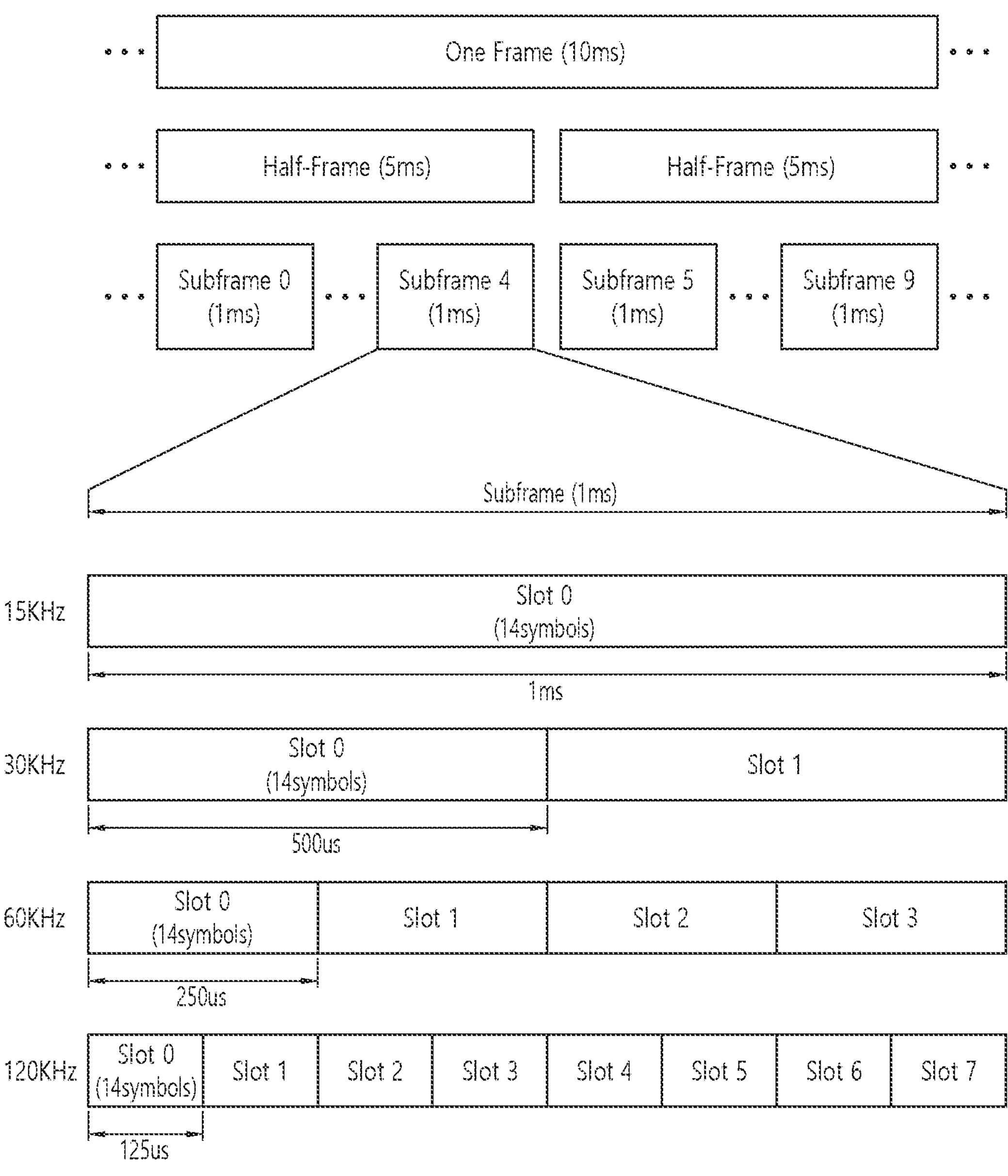
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or interval) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
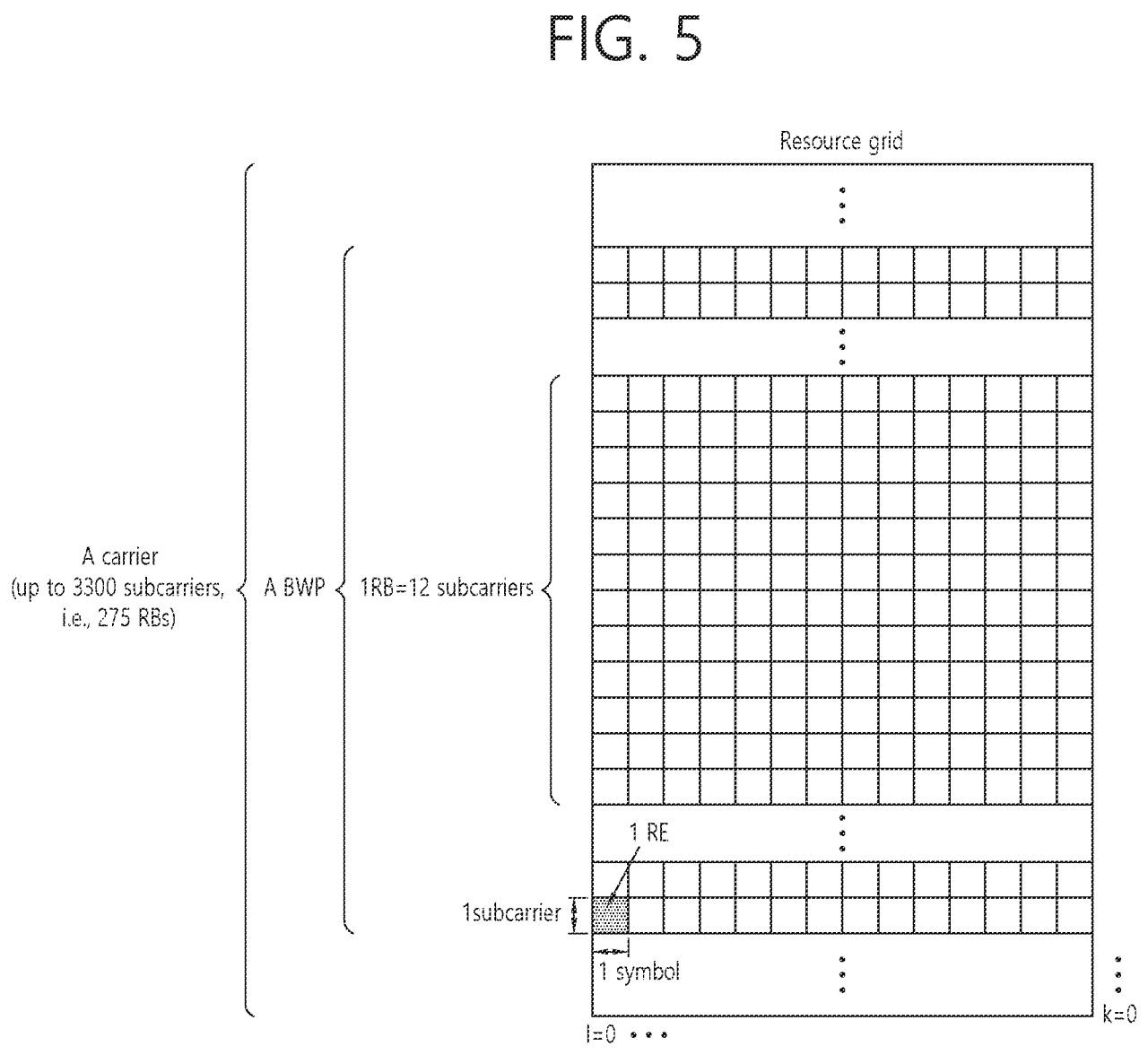

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
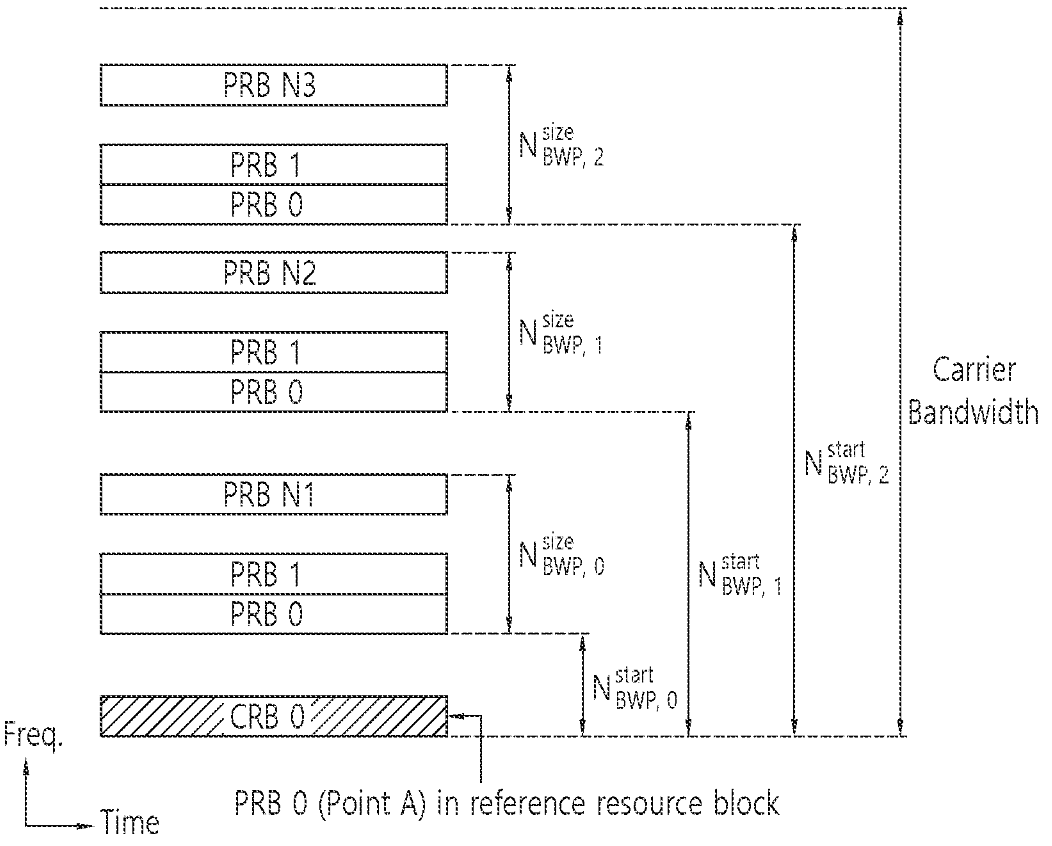
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
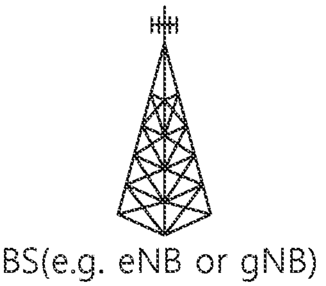
FIG. 7 shows a UE performing V2X or SL communication, based on an embodiment of the present disclosure.
Figure 7:

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
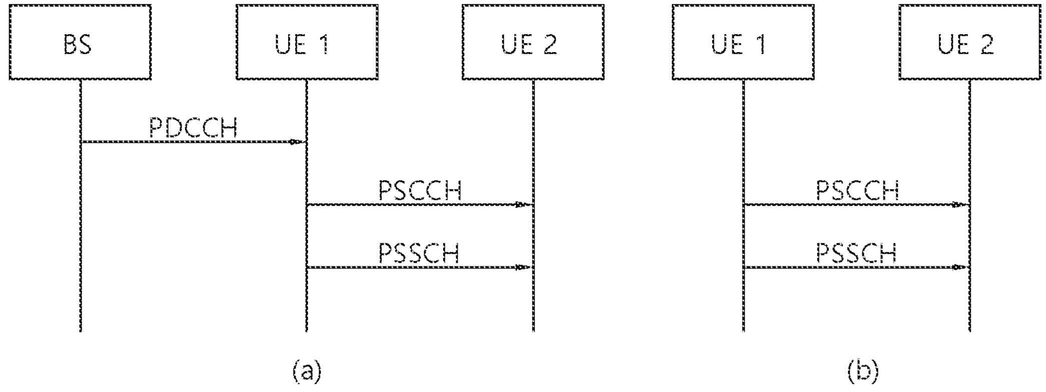
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
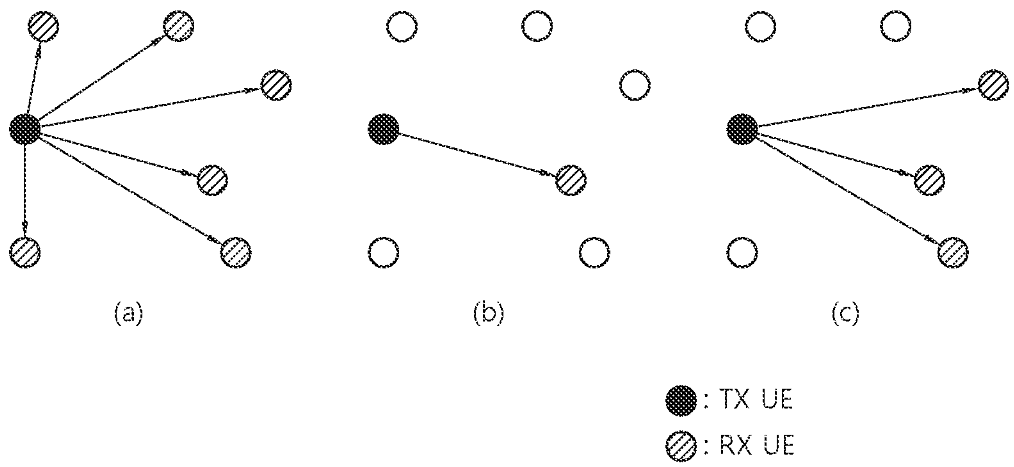
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, SL HARQ feedback may be enabled for unicast. In this case, in case of a non-code block group (non-CBG) operation, if a receiving UE successfully decodes a transport block related to the PSCCH, the receiving UE may generate HARQ-ACK. In addition, the receiving UE may transmit the HARQ-ACK to the transmitting UE. On the other hand, if the receiving UE cannot successfully decode the corresponding transport block after decoding the associated PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After a receiving UE decodes a PSCCH targeting a receiving UE, if the receiving UE fails to decode a transport block related to the PSCCH, the receiving UE may transmit a HARQ-NACK to the transmitting UE through a PSFCH. On the other hand, if a receiving UE decodes a PSCCH targeting the receiving UE, and the receiving UE successfully decodes a transport block related to the PSCCH, the receiving UE may not transmit a HARQ-ACK to a transmitting UE.

(2) Groupcast option 2: After a receiving UE decodes a PSCCH targeting a receiving UE, if the receiving UE fails to decode a transport block related to the PSCCH, the receiving UE may transmit a HARQ-NACK to the transmitting UE through a PSFCH. And, when a receiving UE decodes a PSCCH targeted to the receiving UE, and the receiving UE successfully decodes a transport block related to the PSCCH, the receiving UE may transmit an HARQ-ACK to a transmitting UE through a PSFCH.

For example, if groupcast option 1 is used for SL HARQ feedback, all UEs performing groupcast communication may share a PSFCH resource. For example, UEs belonging to the same group may transmit HARQ feedback using the same PSFCH resource.

For example, if groupcast option 2 is used for SL HARQ feedback, each UE performing groupcast communication may use different PSFCH resources for HARQ feedback transmission. For example, UEs belonging to the same group may transmit HARQ feedback using different PSFCH resources.

For example, when SL HARQ feedback is enabled for groupcast, a receiving UE may determine whether to transmit a HARQ feedback to a transmitting UE based on a Transmission-Reception (TX-RX) distance and/or RSRP.

For example, in the case of TX-RX distance-based HARQ feedback in groupcast option 1, if the TX-RX distance is less than or equal to a communication range requirement, a receiving UE may transmit a HARQ feedback for a PSSCH to a transmitting UE. On the other hand, if the TX-RX distance is greater than a communication range requirement, a receiving UE may not transmit a HARQ feedback for a PSSCH to a transmitting UE. For example, a transmitting UE may notify a receiving UE of the location of the transmitting UE through SCI related to the PSSCH. For example, the SCI related to the PSSCH may be the second SCI. For example, a receiving UE may estimate or obtain the TX-RX distance based on the location of the receiving UE and the location of a transmitting UE. For example, a receiving UE can know a communication range requirement used for a PSSCH by decoding SCI related to the PSSCH.

For example, in the case of resource allocation mode 1, the time (offset) between a PSFCH and a PSSCH may be configured or pre-configured. In the case of unicast and groupcast, if retransmission is required on SL, this may be indicated to a base station by a UE within coverage using a PUCCH. A transmitting UE may transmit an indication to a serving base station of the transmitting UE in a form such as a Scheduling Request (SR)/Buffer Status Report (BSR) rather than a HARQ ACK/NACK form. In addition, even if a base station does not receive the indication, the base station can schedule SL retransmission resource to the UE. For example, in the case of resource allocation mode 2, the time (offset) between a PSFCH and a PSSCH may be configured or pre-configured.

For example, from the viewpoint of transmission of a UE in a carrier, TDM between PSCCH/PSSCH and PSFCH may be allowed for a PSFCH format for SL in a slot. For example, a sequence-based PSFCH format having one symbol may be supported. Here, the one symbol may not be an AGC interval. For example, the sequence-based PSFCH format may be applied to unicast and groupcast.

For example, within a slot associated with a resource pool, a PSFCH resource may be periodically configured to N slot duration or pre-configured. For example, N may be configured to one or more values of 1 or more. For example, N may be 1, 2 or 4. For example, HARQ feedback for transmission in a specific resource pool may be transmitted only through a PSFCH on the specific resource pool.

For example, when a transmitting UE transmits a PSSCH to a receiving UE in slots #X to #N, the receiving UE may transmit HARQ feedback for the PSSCH to the transmitting UE in slot #(N+A). For example, slot #(N+A) may include a PSFCH resource. Here, for example, A may be the smallest integer greater than or equal to K. For example, K may be the number of logical slots. In this case, K may be the number of slots in a resource pool. Or, for example, K may be the number of physical slots. In this case, K may be the number of slots inside and outside the resource pool.

For example, when a receiving UE transmits HARQ feedback on a PSFCH resource in response to one PSSCH transmitted by a transmitting UE to the receiving UE, the receiving UE may determine a frequency domain and/or a code domain of a PSFCH resource based on an implicit mechanism within a configured resource pool. For example, a receiving UE may determine the frequency domain and/or code domain of the PSFCH resource, based on at least one of a slot index related to PSCCH/PSSCH/PSFCH, a sub-channel related to PSCCH/PSSCH, and/or an identifier for distinguishing each receiving UE in a group for HARQ feedback based on groupcast option 2. And/or, for example, a receiving UE may determine the frequency domain and/or code domain of a PSFCH resource, based on at least one of SL RSRP, SINR, L1 source ID, and/or location information.

For example, when a HARQ feedback transmission through a PSFCH of a UE and a HARQ feedback reception through the PSFCH overlap, the UE may select either HARQ feedback transmission through PSFCH or HARQ feedback reception through PSFCH based on the prioritization rule. For example, the prioritization rule may be based on a minimum priority indication of the relevant PSCCH/PSSCH.

For example, when HARQ feedback transmission through PSFCH for a plurality of UEs of the UE overlaps, the UE may select a specific HARQ feedback transmission based on a prioritization rule. For example, the prioritization rule may be based on a minimum priority indication of the relevant PSCCH/PSSCH.

In this specification, the wording "configuration or definition" may be interpreted as being (pre)configured (via predefined signaling (e.g., SIB, MAC signaling, RRC signaling)) from abase station or network. For example, "A may be configured" may include "(pre)configuring/defining or notifying A of a base station or network for a UE". Alternatively, the wording "configure or define" may be interpreted as being previously configured or defined by the system. For example, "A may be configured" may include "A is configured/defined in advance by the system".

Meanwhile, in various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. For example, the TX UE may be a UE which transmits SL CSI-RS(s) and/or a SL CSI report request indication to (target) RX UE(s). For example, the TX UE may be a UE which transmits a (pre-defined) reference signal(s) (e.g., PSSCH demodulation reference signal (DM-RS)) and/or SL (L1) RSRP report request indicator, which is/are used for SL (L1) RSRP measurement, to (target) to RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in various embodiments of the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, when a receiving UE transmits SL HARQ feedback information for a PSSCH and/or PSCCH received from a transmitting UE, the following methods may be considered or partially considered. Here, for example, the corresponding method or partial method may be limitedly applied only when an RX UE successfully decodes/detects a PSCCH scheduling a PSSCH.

- option 1: NACK information is transmitted only when PSSCH decoding/reception fails
- option 2: ACK information is transmitted when PSSCH decoding/reception succeeds, and NACK information is transmitted when PSSCH decoding/reception fails.

Meanwhile, in various embodiments of the present disclosure, a TX UE may transmit the entirety or part of information described below to RX UE(s) through SCI(s). Herein, for example, the TX UE may transmit the entirety or part of the information described below to the RX UE(s) through a first SCI and/or a second SCI.

- PSSCH (and/or PSCCH) related resource allocation information (e.g., the number/positions of time/frequency resources, resource reservation information (e.g., period))
- SL CSI report request indicator or SL (L1) RSRP (and/or SL (L1) RSRQ and/or SL (L1) RSSI) report request indicator
- SL CSI transmission indicator (or SL (L1) RSRP (and/or SL (L1) RSRQ and/or SL (L1) RSSI) information transmission indicator)) (on a PSSCH)
- Modulation and coding scheme (MCS) information
- Transmit power information
- L1 destination ID information and/or L1 source ID information
- SL HARQ process ID information
- New data indicator (NDI) information
- Redundancy version (RV) information
- (Transmission traffic/packet related) QoS information (e.g., priority information)
- SL CSI-RS transmission indicator or information on the number of (to-be-transmitted) SL CSI-RS antenna ports
- Location information of the TX UE or location (or distance region) information of target RX UE(s) (for which SL HARQ feedback is requested)
- Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, etc.

Meanwhile, in various embodiments of the present disclosure, for example, a PSCCH may be replaced/substituted with at least one of SCI, first SCI, and/or second SCI. For example, SCI may be mutually replaced/substituted with a PSCCH, first SCI, and/or second SCI. For example, since a TX UE can transmit second SCI to an RX UE through a PSSCH, the PSSCH and the second SCI can be mutually replaced/substituted. For example, when the SCI configuration fields are divided into two groups in consideration of the (relatively) high SCI payload size, the first SCI including the first SCI configuration field group may be referred to as a 1st SCI or 1st-stage SCI, and the second SCI including the second SCI configuration field group may be referred to as a 2nd SCI or 2nd-stage SCI. For example, first SCI may be transmitted through PSCCH. For example, second SCI may be transmitted through an (independent) PSCCH. For example, second SCI may be piggybacked and transmitted together with data through a PSSCH.

Meanwhile, in various embodiments of the present disclosure, for example, "configuration" or "definition" may mean (resource pool specific) (pre)configuration (via predefined signaling (e.g., SIB, MAC, RRC, etc.)) from base station or network. For example, "that A is configured" may mean "that a base station/network transmits information related to A to a UE". Or, for example, "that A is configured" may mean "designated through predefined signaling (e.g., PC5 RRC) between UEs".

Meanwhile, in various embodiments of the present disclosure, for example, "RLF" may be mutually expanded and interpreted as at least one of out of synch (OOS) and in synch (IS). Meanwhile, in various embodiments of the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a sub-selection window may be replaced/substituted with a selection window and/or a pre-configured number of resource sets within the selection window, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in various embodiments of the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2.

Meanwhile, in various embodiments of the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in various embodiments of the present disclosure, a resource may be replaced/substituted with a slot or a symbol, or vice versa. For example, the resource may include a slot and/or a symbol.

Meanwhile, in various embodiments of the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
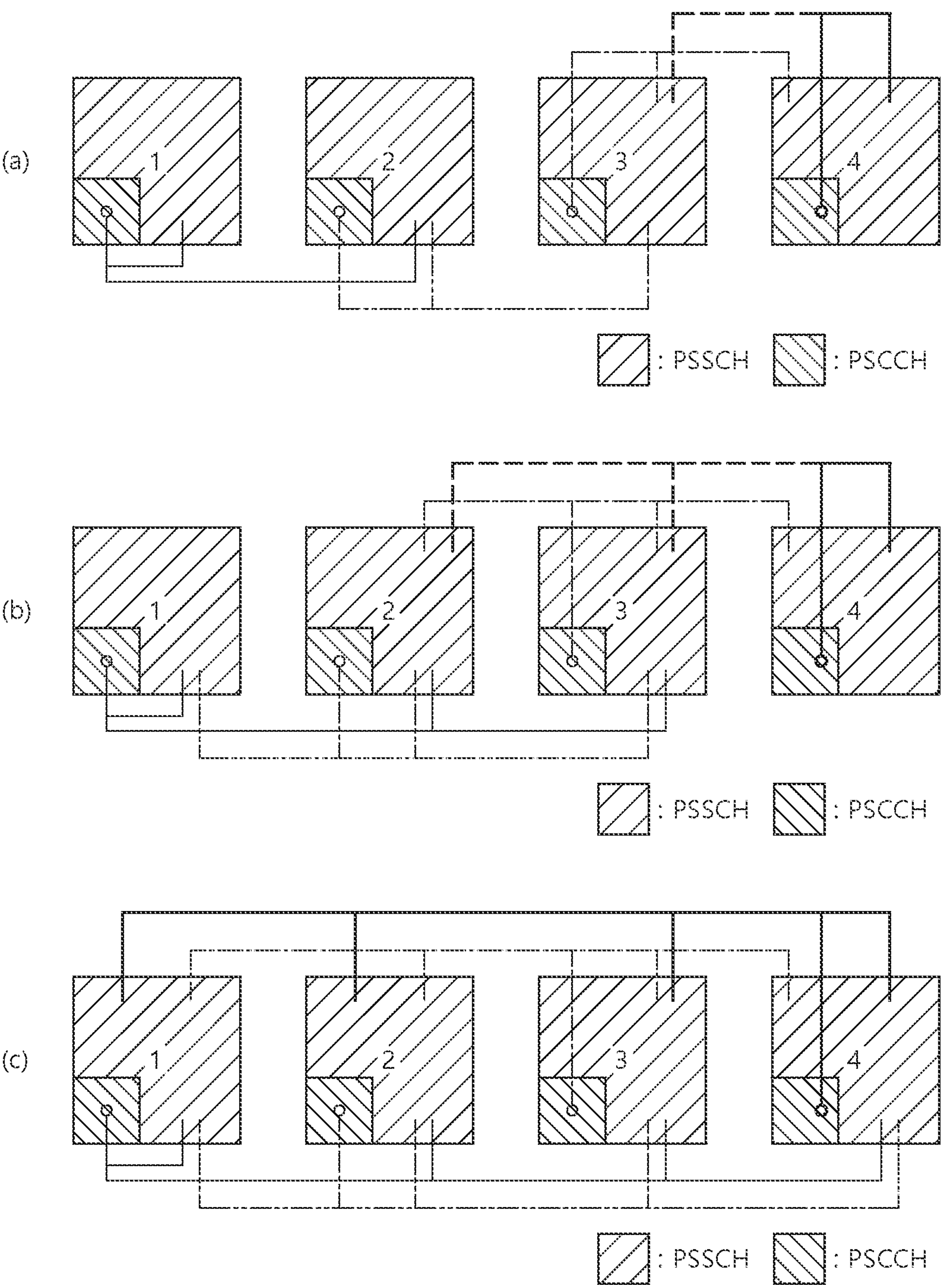
FIG. 10 shows a method in which a UE that has reserved transmission resource(s) informs another UE of the transmission resource(s), based on an embodiment of the present disclosure.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

According to an embodiment of the present disclosure, for example, in the time domain, if (some or all) overlap occurs between a random access response (RAR) related physical uplink control channel (PUCCH) (and/or physical uplink shared channel (PUSCH)) (RA_PC) transmission (RA_PCTX) and an SL transmission (SL_TX) (and/or an SL reception (SL_RX)), it may be configured (for a UE and/or for a base station) that a channel/signal on which transmission (or reception) is performed is determined based on (some) rules below.

For example, the RA_PCTX may be a transmission performed in a type 2 RA. And/or, for example, the RA_PC may include a PUCCH (and/or PUSCH) related to an RA procedure. And/or, for example, the RA_PC may include a PUCCH related to a response message (e.g., MSG 4) related to RA message (MSG) 3. And/or, for example, the RA_PC may include an RA PUSCH (e.g., a PUSCH transmitted based on a response message for PRACH transmission based on a PDCCH order). And/or, for example, the RA_PC may include PUCCH (and/or PUSCH) based on temporary C-RNTI (related to RA procedures) (and/or MSGA-RNTI and/or MSGB-RNTI and/or C-RNTI). And/or, for example, the RA_PC may include a PUSCH including previously configured (RA procedure-related) information (e.g., contention resolution ID, SAE temporary mobile subscriber identity (S-TMSI), etc.). For example, the RA_PC may include information related to whether RAR reception is successful.

Figure 11:
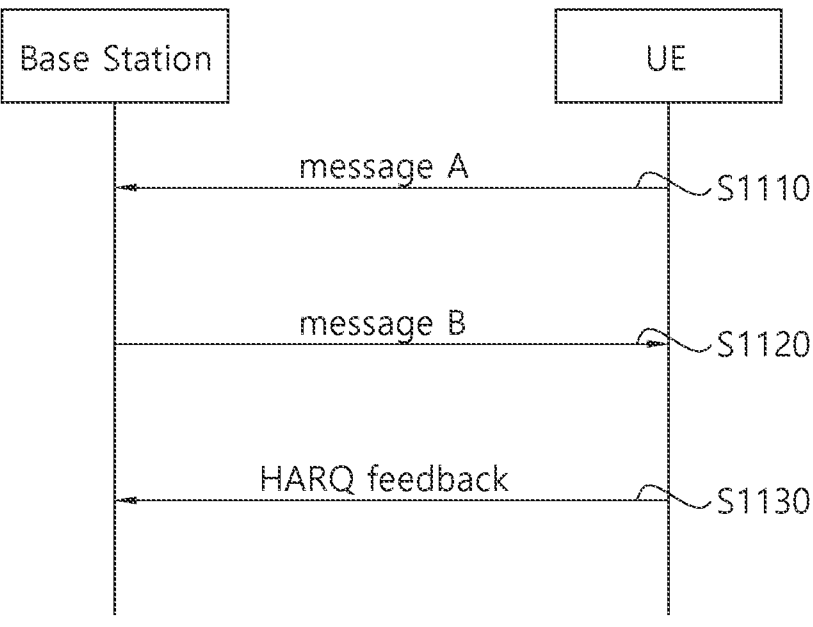
FIG. 11 shows a type 2 random access (RA) procedure performed between a base station and a UE according to an embodiment of the present disclosure.

FIG. 11 shows a type 2 random access (RA) procedure performed between a base station and a UE according to an embodiment of the present disclosure. The embodiment of FIG. 11 may be combined with various embodiments of the present disclosure.

Referring to FIG. 11, in step S1110, a UE may transmit a message A to a base station. For example, the message A may be transmitted based on a PRACH and/or PUSCH. For example, the message A may include an RA preamble and/or MAC PDU. In step S1120, the base station may transmit a message B to the UE. For example, the message B may be a response to the message A. For example, the message B may be transmitted based on a PDCCH and/or PDSCH. For example, the message B may include RAR information and/or a method of transmitting a response signal to the message B of the SL transmitting UE (or related information). For example, the process of exchanging the message A and the message B may mean a type 2 RA procedure. In step S1130, the UE may perform HARQ feedback related to the message B. For example, the HARQ feedback may be to transmit HARQ feedback information (HARQ ACK/NACK). For example, the HARQ feedback information may be transmitted through PUCCH.

According to an embodiment of the present disclosure, for example, the (part of) above-described rules may be limitedly applied when RA_PCTX and SL_TX (and/or SL_RX) are performed on the same carrier (and/or intra-band), and/or when a UE does not have the ability to simultaneously perform RA_PCTX and SL_TX (and/or SL_RX). In addition, for example, whether the proposed rule of the present disclosure may be applied (and/or related parameter configuration) may be configured specifically (or independently or differently) for at least one of resource pool, service type (and/or priority), QoS requirements (e.g. URLLC/EMBB traffic, reliability, latency), cast type (e.g. unicast, groupcast, broadcast), (resource pool) congestion level (e.g., channel busy ratio (CBR)), SL hybrid automatic repeat request (HARQ) feedback scheme (e.g., NACK only feedback, ACK/NACK feedback). For example, in the present disclosure, MSG A may mean a channel/signaling composed of PRACH and PUSCH, and, for example, MSG B may be received from the base station to the UE through PDCCH/PDSCH in response to MSG A. Here, for example, MSG B may include RAR information and/or UE's response signal transmission method/information for MSG B (e.g., RA_PC).

According to an embodiment of the present disclosure, when a transmission of RA_PCTX is omitted by SL_TX (and/or SL_RX) (according to a pre-configured rule), a UE may be configured to perform PRACH transmission again. When such a rule is applied, it may be interpreted as, for example, assuming that the UE has not detected (and/or failed to detect) MSG B.

According to an embodiment of the present disclosure, the priority of RA_PCTX may be configured/consider always higher than that of SL_TX (and/or SL_RX). When such a rule is applied, for example (when SL_TX (and/or SL_RX) and RA_PCTX overlap).

According to an embodiment of the present disclosure, RA_PCTX may be configured/regarded as corresponding to priority index "1" (or, priority index "0", or a pre-configured priority index value (for the transmission purpose)). For example, a case in which the priority index is "1" may be interpreted as a kind of URLLC service transmission. For example, a case in which the priority index is "0" may be interpreted as a kind of EMBB service transmission. For example, when this method is applied, it may be interpreted that the prioritization rule between existing UL transmission and SL transmission (and/or SL reception) is applied based on the RA_PCTX related priority index (and/or the corresponding SL priority threshold reference value). Also, for example, omission between RA_PCTX and SL_TX (and/or SL_RX) may be configured to be determined based on a pre-configured SL priority threshold reference value (For example, it may be interpreted the same as the LTE V2X rule).

Figure 12:
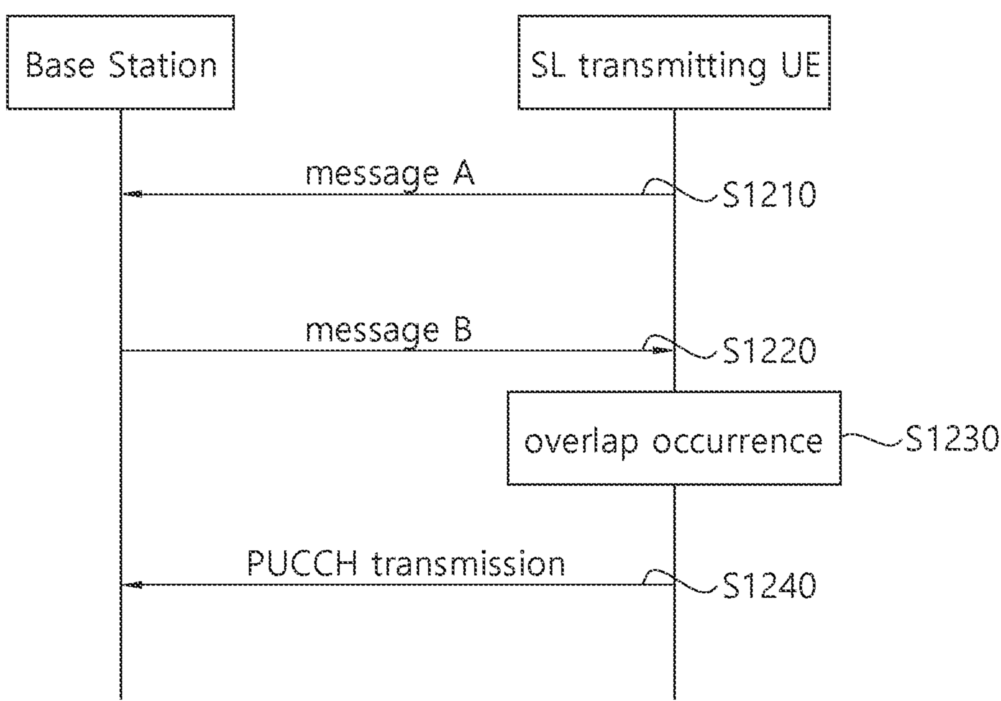
FIG. 12 shows a type 2 random access (RA) procedure performed between a base station and an SL transmitting UE according to an embodiment of the present disclosure.

FIG. 12 shows a type 2 random access (RA) procedure performed between a base station and an SL transmitting UE according to an embodiment of the present disclosure. The embodiment of FIG. 12 may be combined with various embodiments of the present disclosure.

Referring to FIG. 12, in step S1210, a UE performing SL communication (the SL transmitting UE in FIG. 12) may transmit a message A to a base station. For example, the message A may be transmitted based on a PRACH and/or PUSCH. For example, the message A may include an RA preamble and/or MAC PDU. In step S1220, the base station may transmit a message B to the SL transmitting UE. For example, the message B may be a response to the message A. For example, the message B may be transmitted based on a PDCCH and/or PDSCH. For example, the message B may include RAR information and/or a method of transmitting a response signal to the message B of the SL transmitting UE (or related information). For example, the process of exchanging the message A and the message B may mean a type 2 RA procedure. In step S1230, the SL transmission to be transmitted by the SL transmitting UE to the SL receiving UE may overlap with the PUCCH transmission to be transmitted to the base station. That is, for example, the SL transmission and the PUCCH transmission may overlap in time/frequency resources. In this case, for example, if the PUCCH transmission is related to the type 2 RA procedure, the PUCCH transmission may always be prioritized over the SL transmission. In step S1240, the SL transmitting UE can perform the PUCCH transmission regardless of the occurrence of the overlap.

According to an embodiment of the present disclosure, if an RA_PCTX transmission is omitted (by a pre-configured rule), a UE may be configured to assume that (or circumstance that) the UE does not detect MSG B (and/or fails to detect), or MSG B is detected successfully, but does not correspond to the PRACH transmitted by the UE (see Table 5 below). In this case, for example, the UE may be configured to (re) transmit PRACH (or PRACH and PUSCH (e.g., MSG A)).

TABLE 5

| |
|---|
| If the UE detects the DCI format 1_0 with CRC scrambled by a C-RNTI and a transport block in a corresponding PDSCH within the window, the UE transmits a PUCCH with HARQ-ACK information having ACK value if the UE correctly detects the transport block or NACK value if the UE incorrectly detects the transport block and the time alignment timer is running [11, TS 38.321]. |
| If the UE does not detect the DCI format 1_0 with CRC scrambled by the corresponding MsgB-RNTI within the window, or if the UE detects the DCI format 1_0 with CRC scrambled by the corresponding MsgB-RNTI within the window and LSBs of a SFN field in the DCI format 1_0, if applicable, are not same as corresponding LSBs of the SFN where the UE transmitted the PRACH, or if the UE does not correctly receive the transport block in the corresponding PDSCH within the window, or if the higher layers do not identify the RAPID associated with the PRACH transmission from the UE, the higher layers can indicate to the physical layer to transmit only PRACH according to Type-1 random access procedure or to transmit both PRACH and PUSCH according to Type-2 random access procedure [11, TS 38.321]. |
| If the UE does not detect the DCI format 1_0 with CRC scrambled by the corresponding MsgB-RNTI within the window, or if the UE detects the 1_0 with CRC scrambled by the corresponding MsgB-RNTI within the window and LSBs of a SFN field in the DCI format 1_0, if applicable, are not same as corresponding LSBs of the SFN where the UE transmitted the PRACH, or the UE does not correctly receive a corresponding transport block within the window, the UE procedure is as described in [11, TS 38.321]. |

According to an embodiment of the present disclosure, if RA_PCTX transmission is omitted (by a pre-configured rule) but if the UE succeeds in detecting MSG B, the UE may be configured not to (re) transmit PRACH (or PRACH and PUSCH (e.g., MSG A)).

According to an embodiment of the present disclosure, when an SL transmission and a PUCCH transmission related to an RA procedure overlap, since the PUCCH transmission is always prioritized, a UE operating in the SL resource allocation mode 1 can receive resource allocation from a base station more efficiently, and thus the UE can perform more efficient SL communication.

Figure 13:
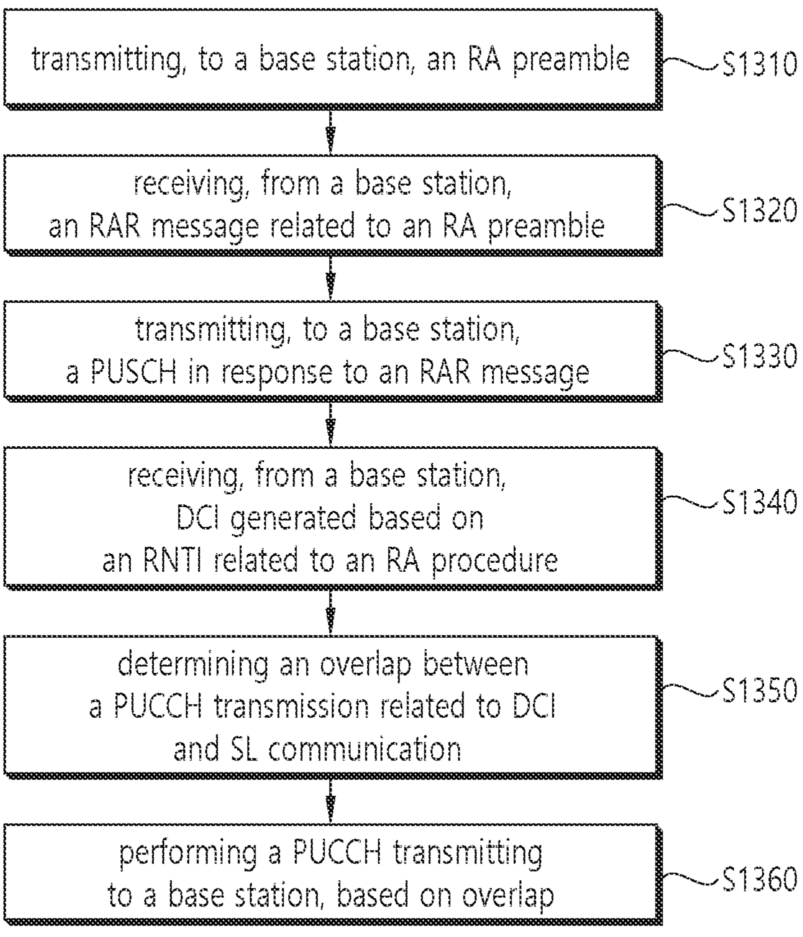
FIG. 13 shows a procedure in which a first device performs wireless communication based on a random access (RA) procedure according to an embodiment of the present disclosure.

FIG. 13 shows a procedure in which a first device performs wireless communication based on a random access (RA) procedure according to an embodiment of the present disclosure. The embodiment of FIG. 13 may be combined with various embodiments of the present disclosure.

Referring to FIG. 13, in step S1310, a first device performing wireless communication based on a random access (RA) procedure may transmit, to a base station, an RA preamble. In step S1320, the first device may receive, from the base station, a random access response (RAR) message related to the RA preamble. In step S1330, the first device may transmit, to the base station, a physical uplink shared channel (PUSCH) in response to the RAR message. In step S1340, the first device may receive, from the base station, downlink control information (DCI) generated based on a radio network temporary identifier (RNTI) related to the RA procedure, in response to the PUSCH. In S1350, the first device may determine an overlap between a physical uplink control channel (PUCCH) transmission related to the DCI and sidelink (SL) communication. In step S1360, the first device may perform the PUCCH transmitting to the base station, based on the overlap. For example, a priority of the PUCCH transmission may be higher than a priority of the SL communication.

For example, the DCI may be a DCI with cyclic redundancy check (CRC) scrambled based on the RNTI, and the RNTI may be a temporary cell (TC)-RNTI.

For example, the RA procedure may be a type 2 RA procedure, the RA preamble may be transmitted through a message A, the DCI may be received through a message B, the DCI may be a DCI with CRC scrambled based on the RNTI, and the RNTI may be a MSGB-RNTI related to the message B.

For example, the PUCCH transmission may be related to one among an identifier (ID) related to the message A, an ID related to the message B, or an ID related to the type 2 RA procedure.

For example, the message A may be transmitted based on at least one among a physical random access channel (PRACH) or a physical uplink shared channel (PUSCH).

For example, the message B may be transmitted based on at least one among a physical downlink control channel (PDCCH) or a physical downlink shared channel (PDSCH).

For example, the message B may include information related to the PUCCH transmission.

For example, the PUCCH transmission may be transmitted based on the message B, and the information related to the PUCCH transmission may include information related to a method of the PUCCH transmission.

For example, the priority of the PUCCH transmission may be always higher than the priority of the SL communication.

For example, the SL communication may be dropped based on the overlap.

For example, the PUCCH transmission may be transmitted regardless of the priority of the SL communication.

For example, a priority index related to the PUCCH transmission may be 0 or 1.

For example, the PUCCH transmission may be related to a hybrid automatic repeat request (HARQ) feedback.

The above-described embodiment may be applied to various devices described below. For example, a processor 102 of a first device 100 performing wireless communication based on a random access (RA) procedure may control a transceiver 102 to transmit, to a base station 300, an RA preamble. And, the processor 102 of the first device 100 may control the transceiver 102 to receive, from the base station 300, a random access response (RAR) message related to the RA preamble. And, the processor 102 of the first device 100 may control the transceiver 102 to transmit, to the base station 300, a physical uplink shared channel (PUSCH) in response to the RAR message. And, the processor 102 of the first device 100 may control the transceiver 102 to receive, from the base station 300, downlink control information (DCI) generated based on a radio network temporary identifier (RNTI) related to the RA procedure, in response to the PUSCH. And, the processor 102 of the first device 100 may determine an overlap between a physical uplink control channel (PUCCH) transmission related to the DCI and sidelink (SL) communication. And, the processor 102 of the first device 100 may perform the PUCCH control the transceiver 102 to transmitting to the base station 300, based on the overlap. For example, a priority of the PUCCH transmission may be higher than a priority of the SL communication.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: transmit, to a base station, a random access (RA) preamble; receive, from the base station, a random access response (RAR) message related to the RA preamble; transmit, to the base station, a physical uplink shared channel (PUSCH) in response to the RAR message; receive, from the base station, downlink control information (DCI) generated based on a radio network temporary identifier (RNTI) related to an RA procedure, in response to the PUSCH; determine an overlap between a physical uplink control channel (PUCCH) transmission related to the DCI and sidelink (SL) communication; and perform the PUCCH transmitting to the base station, based on the overlap, wherein a priority of the PUCCH transmission may be higher than a priority of the SL communication.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: transmit, to a base station, a random access (RA) preamble; receive, from the base station, a random access response (RAR) message related to the RA preamble; transmit, to the base station, a physical uplink shared channel (PUSCH) in response to the RAR message; receive, from the base station, downlink control information (DCI) generated based on a radio network temporary identifier (RNTI) related to an RA procedure, in response to the PUSCH; determine an overlap between a physical uplink control channel (PUCCH) transmission related to the DCI and sidelink (SL) communication; and perform the PUCCH transmitting to the base station, based on the overlap, wherein a priority of the PUCCH transmission may be higher than a priority of the SL communication.

According to an embodiment of the present disclosure, a non-transitory computer-readable storage medium storing instructions may be proposed. For example, the instructions, when executed, may cause a first device to: transmit, to a base station, a random access (RA) preamble; receive, from the base station, a random access response (RAR) message related to the RA preamble; transmit, to the base station, a physical uplink shared channel (PUSCH) in response to the RAR message; receive, from the base station, downlink control information (DCI) generated based on a radio network temporary identifier (RNTI) related to an RA procedure, in response to the PUSCH; determine an overlap between a physical uplink control channel (PUCCH) transmission related to the DCI and sidelink (SL) communication; and perform the PUCCH transmitting to the base station, based on the overlap, wherein a priority of the PUCCH transmission may be higher than a priority of the SL communication.

Figure 14:
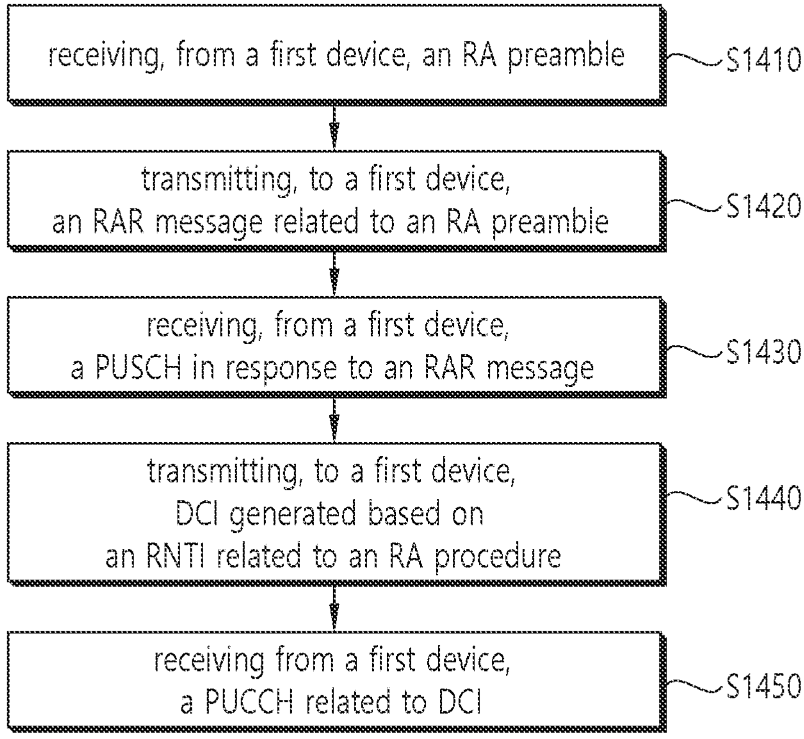
FIG. 14 shows a procedure in which a base station performs wireless communication based on a random access (RA) procedure according to an embodiment of the present disclosure.

FIG. 14 shows a procedure in which a base station performs wireless communication based on a random access (RA) procedure according to an embodiment of the present disclosure. The embodiment of FIG. 14 may be combined with various embodiments of the present disclosure.

Referring to FIG. 14, in step S1410, a base station performing wireless communication based on a random access (RA) procedure may receive, from a first device, an RA preamble. In step S1420, the base station may transmit, to the first device, a random access response (RAR) message related to the RA preamble. In step S1430, the base station may receive, from the first device, a physical uplink shared channel (PUSCH) in response to the RAR message. In step S1440, the base station may transmit, to the first device, downlink control information (DCI) generated based on a radio network temporary identifier (RNTI) related to the RA procedure, in response to the PUSCH. In step S1450, the base station may receive from the first device, a physical uplink control channel (PUCCH) related to the DCI. For example, the PUCCH transmission and sidelink (SL) communication may overlap, and a priority of the PUCCH transmission may be higher than a priority of the SL communication.

For example, the SL communication may be dropped based on the overlap of the PUCCH transmission and the SL communication.

The above-described embodiment may be applied to various devices described below. For example, a processor 302 of a base station 300 performing wireless communication based on a random access (RA) procedure may control a transceiver 306 to receive, from a first device 100, an RA preamble. And, the processor 302 of the base station 300 may control the transceiver 306 to transmit, to the first device 100, a random access response (RAR) message related to the RA preamble. And, the processor 302 of the base station 300 may control the transceiver 306 to receive, from the first device 100, a physical uplink shared channel (PUSCH) in response to the RAR message. And, the processor 302 of the base station 300 may control the transceiver 306 to transmit, to the first device 100, downlink control information (DCI) generated based on a radio network temporary identifier (RNTI) related to the RA procedure, in response to the PUSCH. And, the processor 302 of the base station 300 may control the transceiver 306 to receive from the first device 100, a physical uplink control channel (PUCCH) related to the DCI. For example, the PUCCH transmission and sidelink (SL) communication may overlap, and a priority of the PUCCH transmission may be higher than a priority of the SL communication.

According to an embodiment of the present disclosure, a base station for performing wireless communication may be proposed. For example, the base station may comprise: one or more memories storing instructions; one or more transceivers; and one or more processors connected to the one or more memories and the one or more transceivers. For example, the one or more processors may execute the instructions to: receive, from a first device, a random access (RA) preamble; transmit, to the first device, a random access response (RAR) message related to the RA preamble; receive, from the first device, a physical uplink shared channel (PUSCH) in response to the RAR message; transmit, to the first device, downlink control information (DCI) generated based on a radio network temporary identifier (RNTI) related to an RA procedure, in response to the PUSCH; and receive from the first device, a physical uplink control channel (PUCCH) related to the DCI, wherein the PUCCH transmission and sidelink (SL) communication may overlap, and wherein a priority of the PUCCH transmission may be higher than a priority of the SL communication.

For example, the SL communication may be dropped based on the overlap of the PUCCH transmission and the SL communication.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
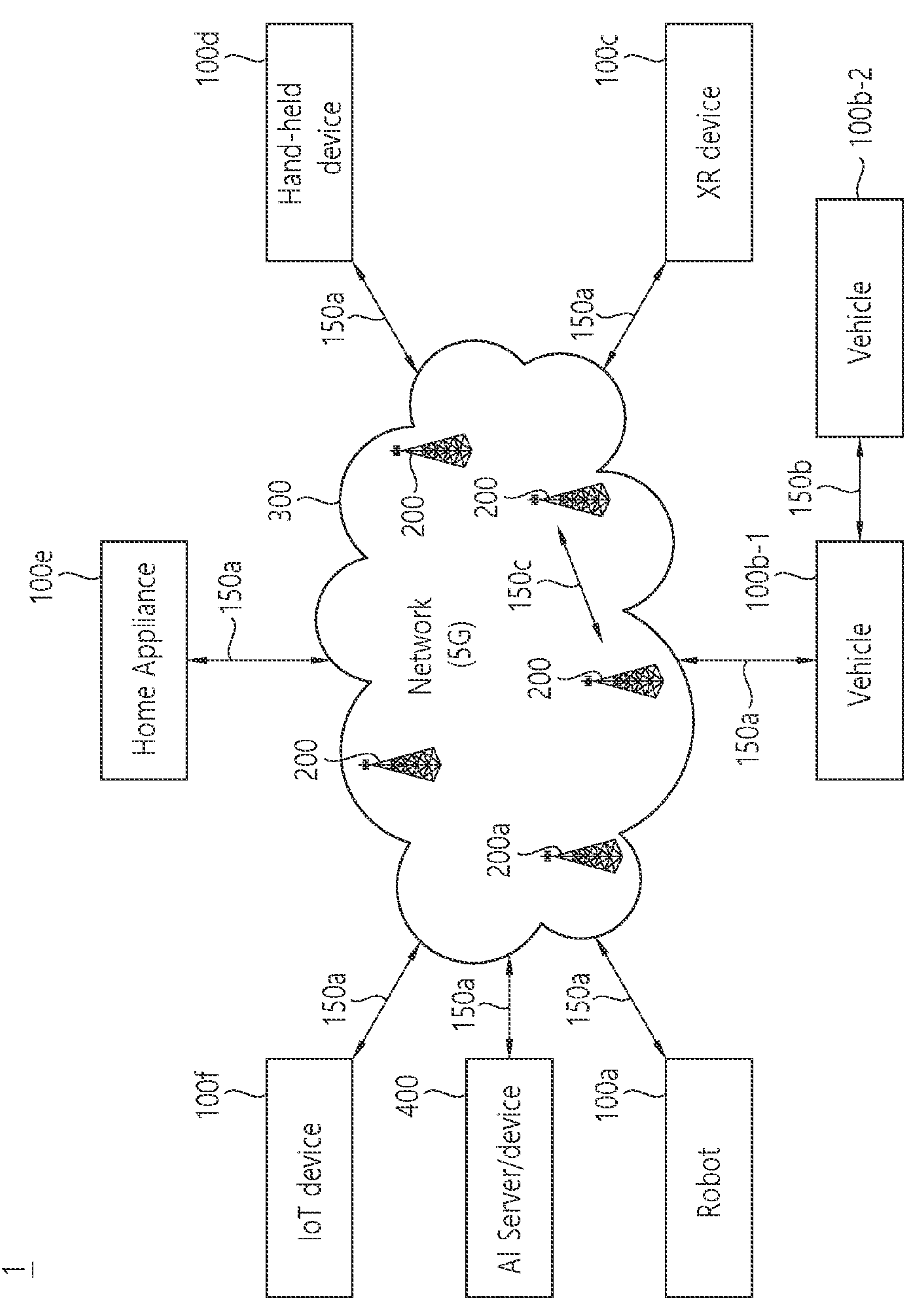
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5GNew RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
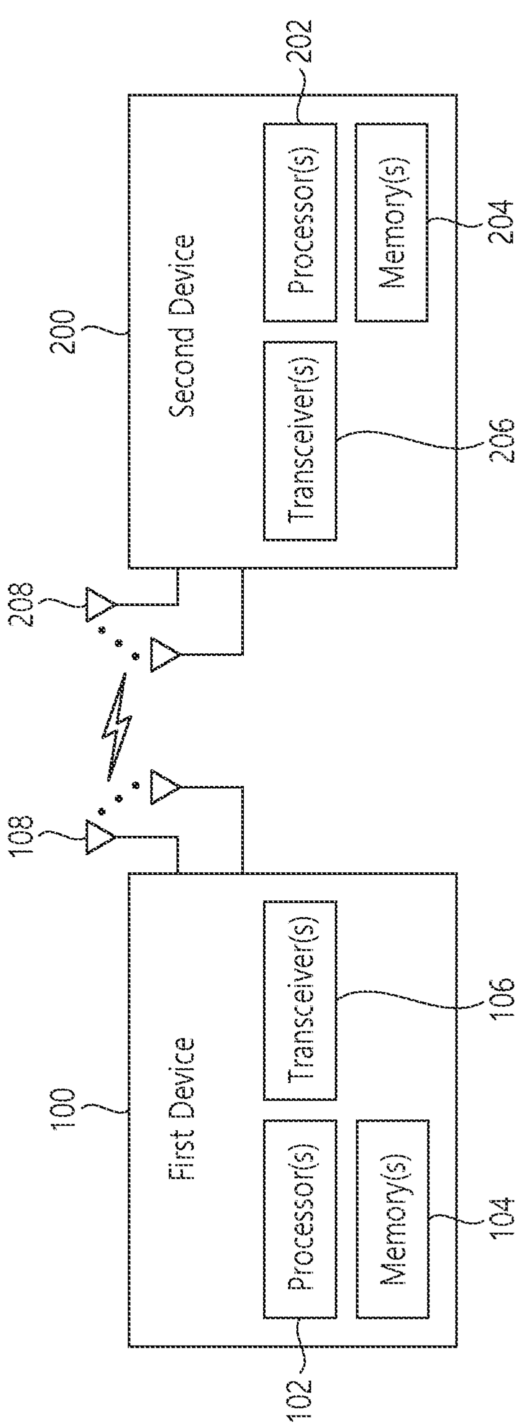
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
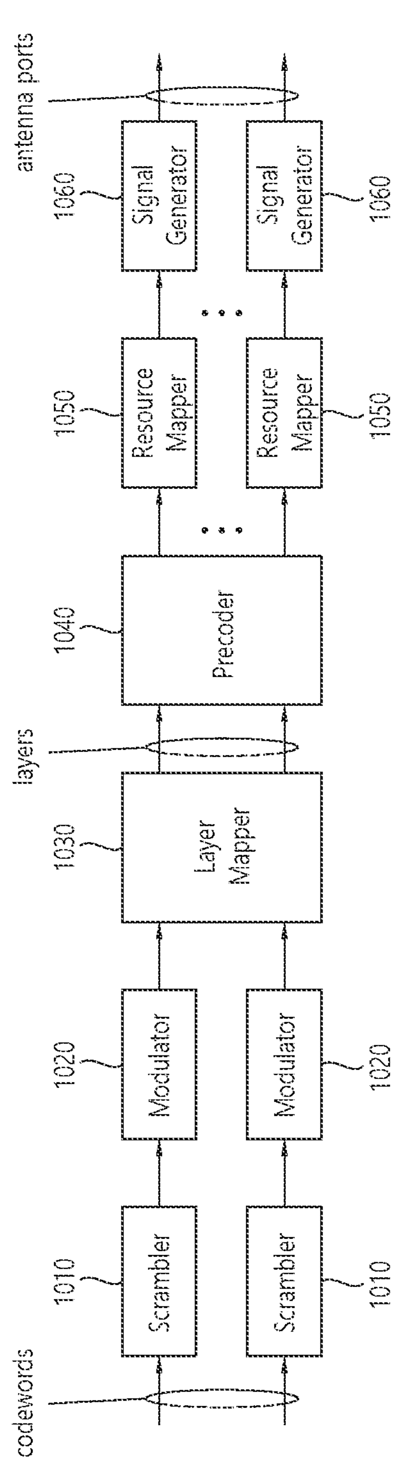
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
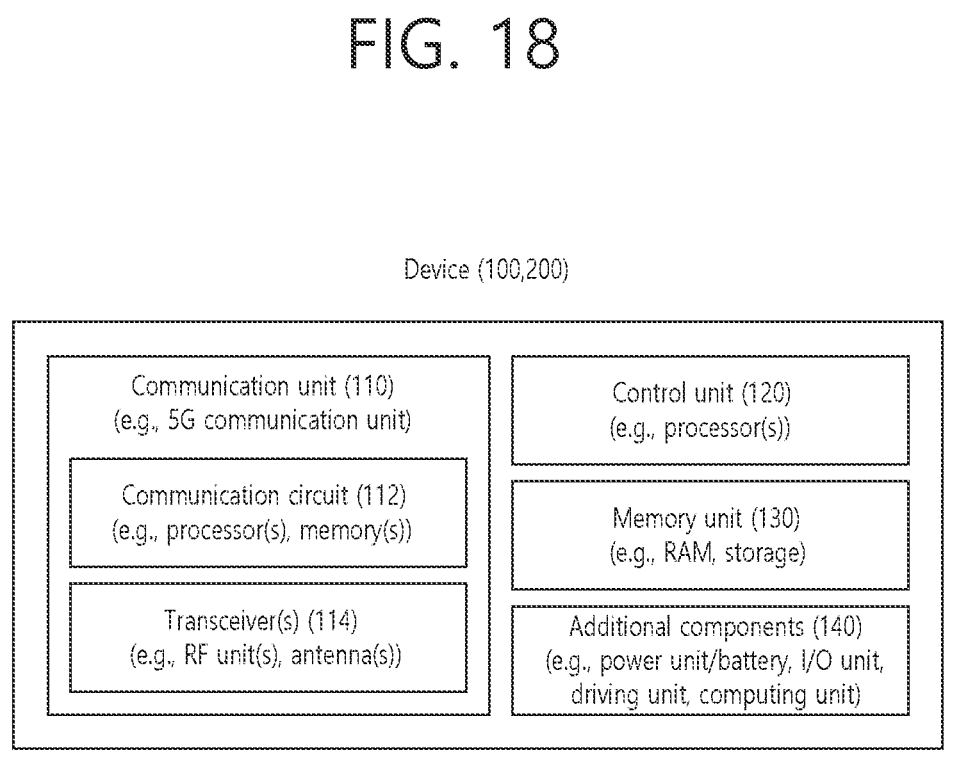

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
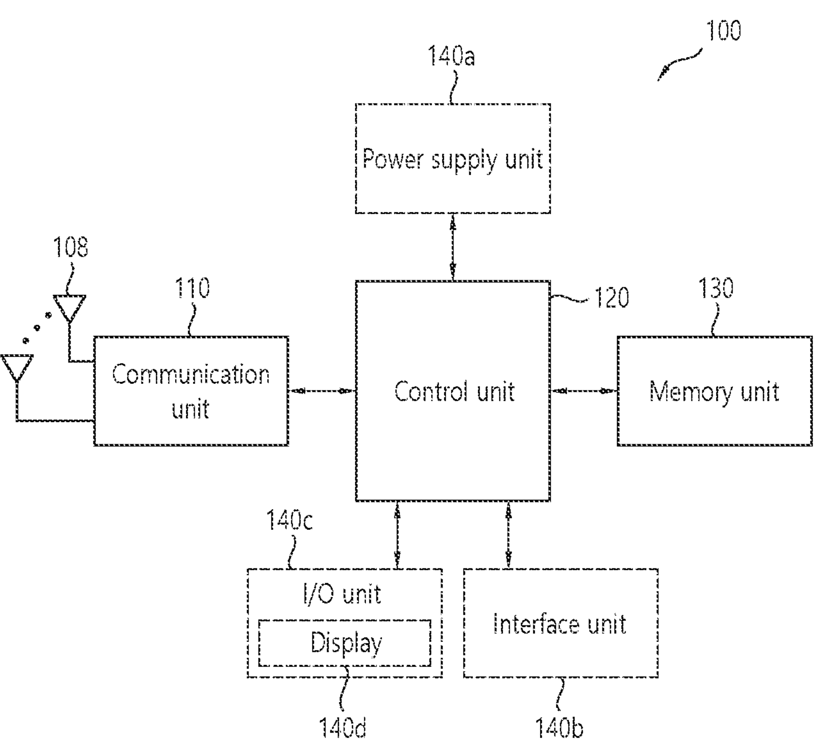
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
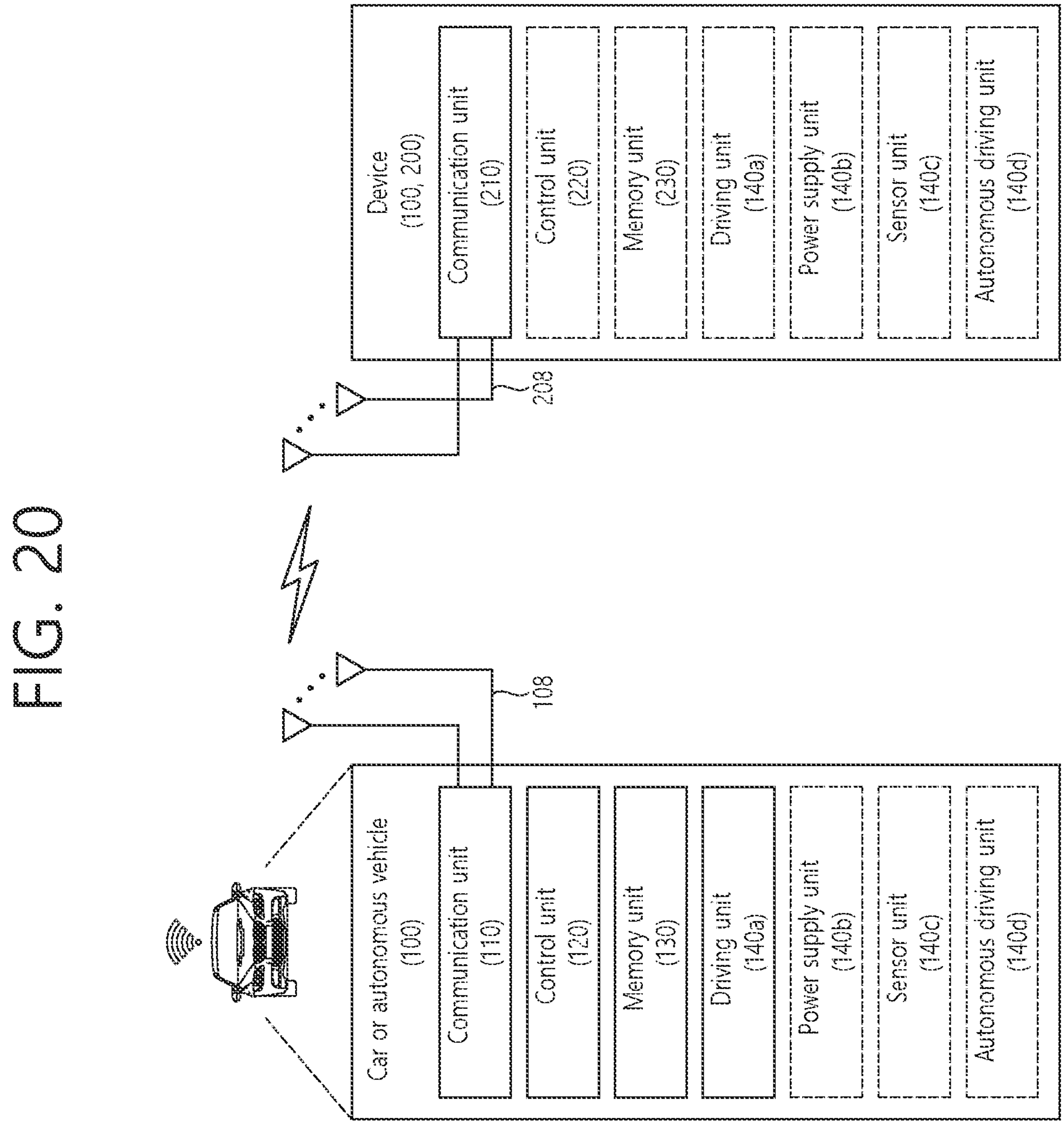
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

transmitting, to a base station, a random access preamble;

receiving, from the base station, a random access response (RAR) message in response to the transmission of the random access preamble;

transmitting, to the base station, a physical uplink shared channel (PUSCH) based on the RAR message;

receiving, from the base station, downlink control information (DCI) with cyclic redundancy check (CRC) scrambled by a temporary cell (TC) radio network temporary identifier (RNTI) related to a random access procedure, in response to the transmission of the PUSCH; and transmitting, to the base station, a physical uplink control channel (PUCCH) including information for hybrid automatic repeat request (HARQ) feedback related to the random access procedure, based on an overlap between the transmission of the PUCCH and sidelink (SL) communication, wherein the PUCCH has a higher priority than the SL communication, based on the PUCCH being related to the TC-RNTI.

2. The method of claim 1, wherein the SL communication is dropped based on the overlap.

3. The method of claim 1, wherein the PUCCH is transmitted regardless of the priority of the SL communication.

4. The method of claim 1, wherein a priority index related to the PUCCH transmission is 0 or 1.

5. A first device comprising:

one or more processors;

one or more transceivers; and one or more memories connected to the one or more processors and storing instructions, wherein the instructions, based on being executed by the one or more processors, cause the first device to:

transmit, to a base station, a random access preamble;

receive, from the base station, a random access response (RAR) message in response to the transmission of the random access preamble;

transmit, to the base station, a physical uplink shared channel (PUSCH) based on the RAR message;

receive, from the base station, downlink control information (DCI) with cyclic redundancy check (CRC) scrambled by a temporary cell (TC) radio network temporary identifier (RNTI) related to a random access procedure, in response to the transmission of the PUSCH; and transmit, to the base station, a physical uplink control channel (PUCCH) including information for hybrid automatic repeat request (HARQ) feedback related to the random access procedure, based on an overlap between the transmission of the PUCCH and sidelink (SL) communication, wherein the PUCCH has a higher priority than the SL communication, based on the PUCCH being related to the TC-RNTI.

6. A processing device adapted to control a first device, the processing device comprising:

one or more processors; and one or more memories connected to the one or more processors and storing instructions, wherein the instructions, based on being executed by the one or more processors, cause the first device to:

transmit, to a base station, a random access preamble;

receive, from the base station, a random access response (RAR) message in response to the transmission of the random access preamble;

transmit, to the base station, a physical uplink shared channel (PUSCH) based on the RAR message;

receive, from the base station, downlink control information (DCI) with cyclic redundancy check (CRC) scrambled by a temporary cell (TC) radio network temporary identifier (RNTI) related to a random access procedure, in response to the transmission of the PUSCH; and transmit, to the base station, a physical uplink control channel (PUCCH) including information for hybrid automatic repeat request (HARQ) feedback related to the random access procedure, based on an overlap between the transmission of the PUCCH and sidelink (SL) communication, wherein the PUCCH has a higher priority than the SL communication, based on the PUCCH being related to the TC-RNTI.

* * * * *